United States Patent [19]

Sherman

[11] Patent Number: 4,719,815
[45] Date of Patent: Jan. 19, 1988

[54] TRANSVERSELY MOUNTED TRANSMISSION ARRANGEMENT

[75] Inventor: James F. Sherman, Brighton, Mich.
[73] Assignee: General Motors Corporation, Detroit, Mich.
[21] Appl. No.: 880,392
[22] Filed: Jun. 30, 1986
[51] Int. Cl.⁴ .................... F16H 57/02; F16H 37/08
[52] U.S. Cl. ................................. 74/606 R; 74/635; 74/607
[58] Field of Search ............... 74/607, 606 R, 695, 74/665 GE, 705, 665 F, 665 G

[56] References Cited

U.S. PATENT DOCUMENTS

| | | | |
|---|---|---|---|
| 3,800,626 | 4/1974 | Koivunen | 74/695 |
| 3,805,641 | 4/1974 | Hause | 74/695 |
| 4,056,988 | 11/1977 | Kubo et al. | 74/695 |
| 4,261,227 | 4/1981 | Yamamori et al. | 74/695 |
| 4,271,721 | 6/1981 | Yamamori et al. | 74/695 |
| 4,364,285 | 12/1982 | Morisawa et al. | 74/695 |
| 4,367,661 | 1/1983 | Moroto et al. | 74/665 GE |
| 4,526,061 | 7/1985 | Sakakibara et al. | 74/695 |
| 4,526,062 | 7/1985 | Sakakibara et al. | 74/695 |

Primary Examiner—Gary L. Smith
Assistant Examiner—Vinh Luong
Attorney, Agent, or Firm—Donald F. Scherer

[57] ABSTRACT

A transversely mounted transmission has a torque converter housing portion, a gear housing portion, and differential housing portion each having a centerline noncoincidental with the others. The torque converter housing portion has a mounting face adapted to be secured to an engine at an engine mounting plane. The differential housing portion has a substantially cylindrical section disposed on the engine side of the mounting plane. At least part of the differential housing is disposed within a cylindrical extension defined by the outer periphery of the torque converter housing portion.

3 Claims, 3 Drawing Figures

TRANSVERSELY MOUNTED TRANSMISSION ARRANGEMENT

BACKGROUND OF THE INVENTION

This invention relates to transversely mounted transmissions and more particularly to such transmissions wherein the torque transmitter and differential gearing are on separate but parallel axes.

Prior art transverse mounted engine-transmission arrangements, incorporating multiple piece housings, have the differential housing portion disposed adjacent the torque converter or clutch housing portion on the same side of the plane of the engine mounting face. These arrangements result in a large offset between the engine and output shaft centerlines. It is possible to reduce the centerline offset by using a one-piece housing or displacing the differential housing transversely of the torque housing, however, this results in output shafts of unequal lengths.

SUMMARY OF THE INVENTION

The present invention seeks to overcome the shortcomings of the multiple piece housing arrangements by having the torque converter housing portion and the differential housing portion disposed on opposite sides of the plane of the engine mounting face. With this arrangement it is possible to have the outer peripheral envelope of the differential housing overlap a portion of the torque converter housing envelope as defined by a cylindrical extension of the outer periphery of the torque converter housing. This reduces the distance between the engine centerline and the output shaft centerlines. The output shafts can be made of substantially equal lengths. These attributes provide improved vehicle weight distribution and vehicle handling.

It is an object of this invention to provide an improved transversely mounted transmission wherein the axle centerlines are substantially parallel to the engine centerline and the distance therebetween is reduced by placing the differential housing on the engine side of the engine-transmission interface.

It is another object of this invention to provide an improved transversely mounted engine-transmission arrangement having a substantially hemispherical housing for the transmission torque input member and a substantially cylindrical housing for the output differential wherein the output differential has its axis substantially parallel to the engine centerline and wherein the differential housing is disposed on the engine side of a mounting face between the engine and transmission with at least a portion of the cylindrical extensions of the outer periphery of the hemispherical housing being overlapped on the cylindrical housing of the differential.

It is a further object of this invention to provide an improved transverse engine-mounted transmission including a multiple piece housing having a torque input member housing with a centerline coincident with the engine centerline and a flat mounting face; a gear member housing and a differential member housing with both said last-mentioned housings having centerlines parallel to and offset from the engine centerline and wherein the differential housing is disposed on the engine side of the mounting face such that both the torque input member housing and the differential member housing have outer peripheries defining cylindrical envelopes, the extensions of which are partially intersecting.

These and other objects and advantages of the present invention will be more apparent from the following description and drawings.

DESCRIPTION OF THE PREFERRED EMBODIMENT

Figure 1:
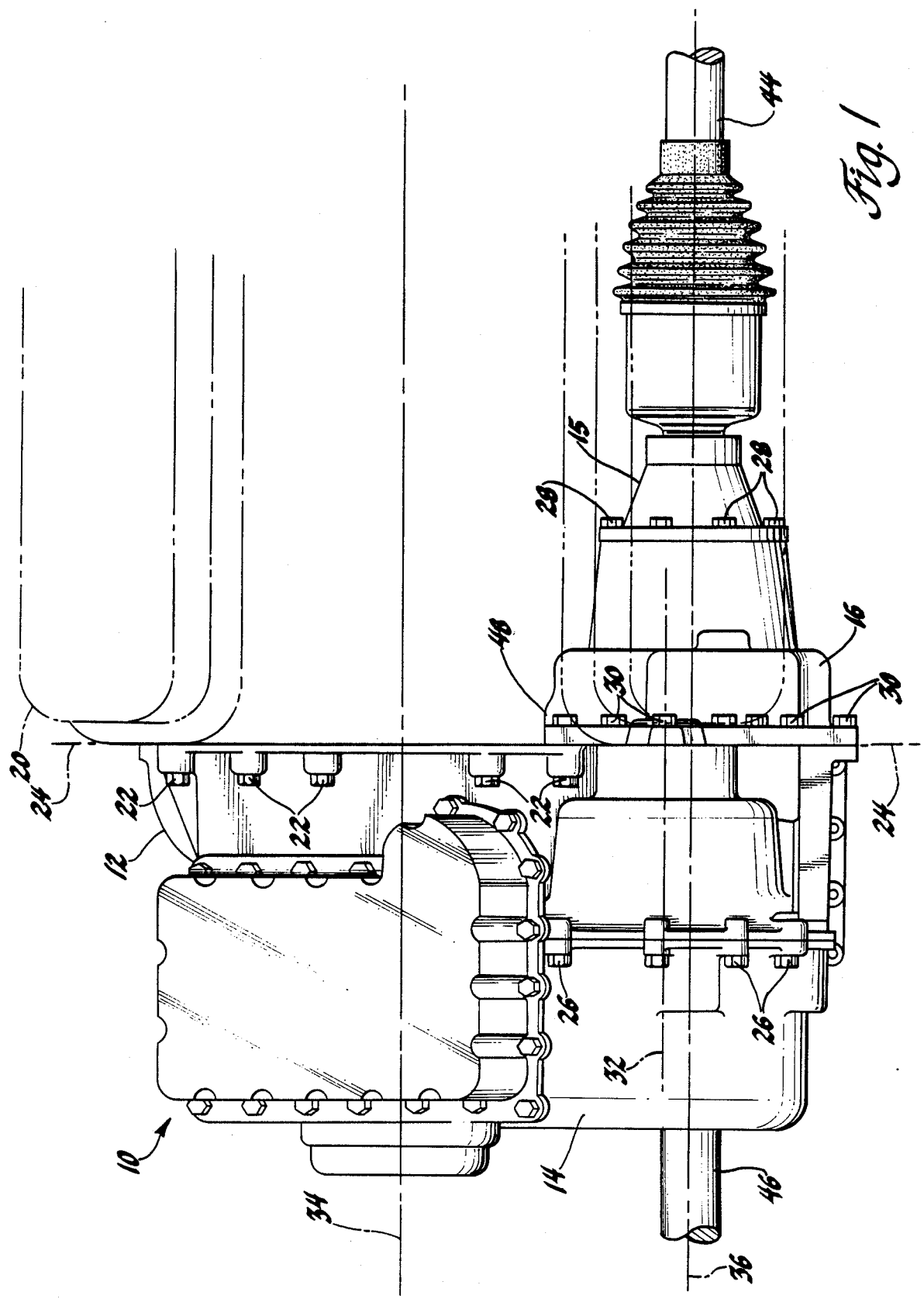
FIG. 1 is an elevational view of a transversely mounted transmission.

Referring to the drawings, wherein like characters represent the same or corresponding parts throughout the several views, there is seen especially in FIG. 1, a transmission assembly 10 comprised of a multiple piece housing. The transmission 10 has a torque input member housing 12, a gear member housing 14, a differential housing 16, and an extension housing 15.

Figure 2:
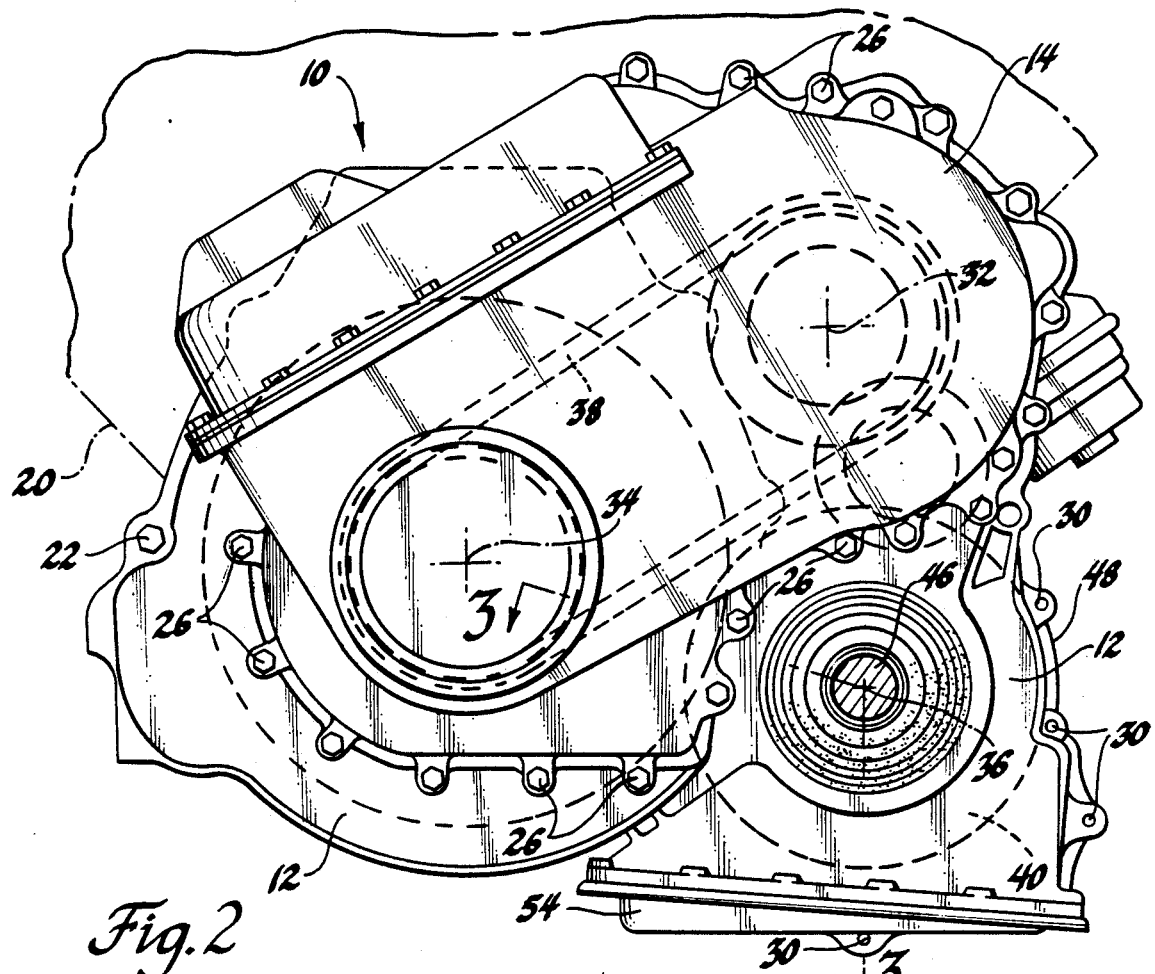
FIG. 2 is a left side view of the transmission.
Figure 3:
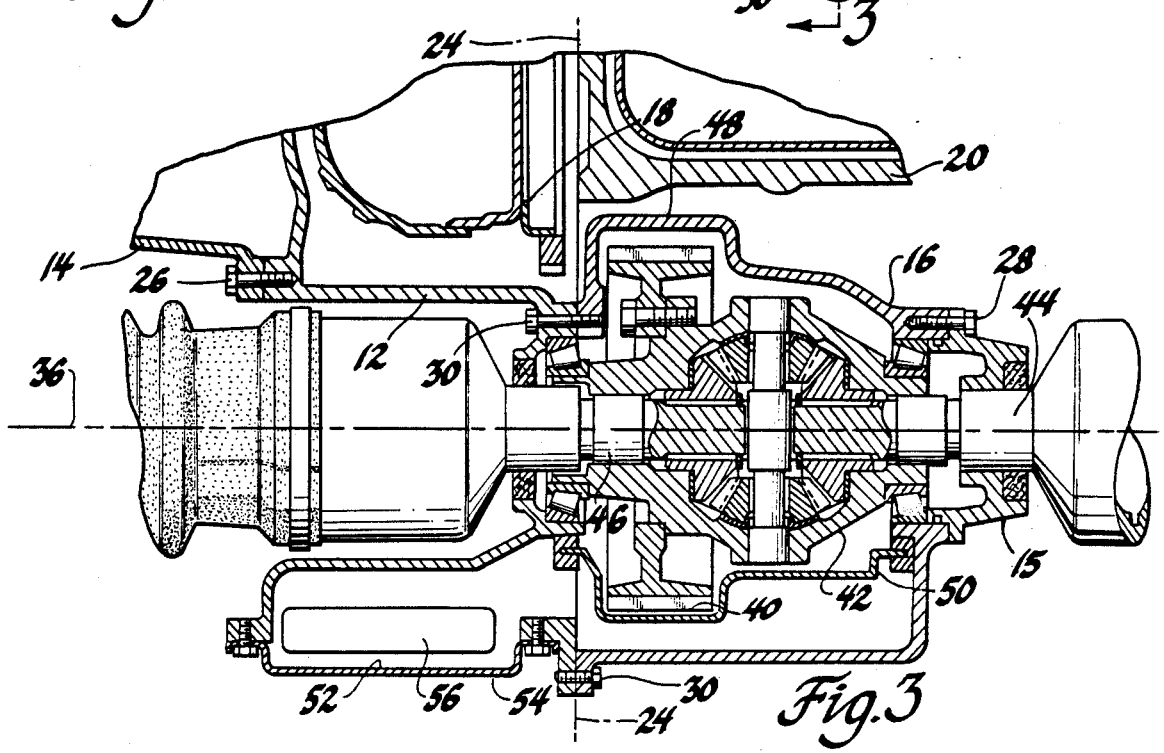
FIG. 3 is a sectional view taken along line 3—3 of FIG. 2.

The torque input member housing 12 encloses a conventional torque converter 18, a portion of which is shown in FIG. 3. The housing 12 is secured to an engine 20 shown in phantom line in FIGS. 1 and 2 and in solid line in FIG. 3. The fastening of the transmission to the engine is accomplished by a plurality of fasteners 22. The interface or connecting face between the transmission 10 and engine 20 is defined by a mounting plane 24.

The gear housing 14 is secured by fasteners 26 to the housing 12, and by fasteners 30 to the differential housing 16. The extension 15 is secured by fasteners 28 to differential housing 16. The gear housing 14 provides an envelope or enclosed space for a conventional three or four speed planetary or spur gear arrangement, such as those disclosed in U.S. Pat. No. 3,800,626 to Koivunen issued Apr. 2, 1974; U.S. Pat. No. 4,086,827 to Chana issued May 2, 1978 or U.S. Pat. No. 4,222,283 to Nagy issued Sept. 16, 1980. The planetary gear arrangement is disposed on an axis or centerline 32. This centerline 32 is offset from an engine-torque converter centerline 34 and also from a differential or output shaft centerline 36.

The engine torque transmitted via the torque converter 18 is delivered to the planetary gear arrangement through a conventional chain drive mechanism 38. The torque is transmitted from the planetary gearing through meshing gears to a ring gear 40. The gear 40 is disposed within the differential housing 16 and is the input member for a conventional differential arrangement 42. The differential arrangement 42 has a pair of output shafts 44 and 46 which are connected to drive conventional wheel mechanisms of a vehicle, not shown.

As best seen in FIGS. 1 and 2, the housing 12 can be defined as having a substantially hemispherical shape. The outer periphery of the housing 12 defines a circle which may be extended along the centerline 34 to define a cylindrical envelope. The differential housing 16 has an outer circular periphery 48 which can be defined by a cylindrical envelope extending along the centerline 36. The extensions of these cylindrical envelopes enclosing the housing 12 and 16 are overlapping or intersecting. This overlapping or intersecting portion can best be seen in FIG. 3 where the outer periphery 48 is closer to the centerline 34 than is the outer periphery of the housing 12.

This is accomplished by having the differential housing 16 disposed on the engine side of the mounting plane 24 while the housing 12 is disposed on the torque converter side of the mounting plane 24. This permits the output shaft centerline 36 to be disposed as closely as possible with the engine and torque converter centerline 34. This provides a very compact power package or transmission arrangement which improves vehicle weight distribution resulting in improved handling of the vehicle.

With the differential 42 disposed on the engine side of the mounting plane 24, the output shafts 44 and 46 can be made of substantially equal length since the differential can be disposed very close to the longitudinal centerline of the vehicle. As is well-known in front wheel drive vehicles, vehicle handling is improved with the use of equal length output shafts. One of the advantages of equal length output shafts is that the drive angle between the differential outputs and the driven wheels are substantially equal and this angle is at a minimum for both output shafts.

The differential housing 16 has disposed therein a shield 50, as seen in FIG. 3, which prevents a churning of fluid which might collect in the sump 52 defined by the bottom pan 54. The fluid collected in this sump will be drawn through a conventional filter 56 by a conventional hydraulic control pump, not shown. As is well-known, these control pumps are driven by the engine shaft either before or after its connection with the torque converter.

The torque input mechanism is described as a torque converter. However, it is well-known within the knowledge of those skilled in the art to utilize a friction clutch or perhaps even a continuously variable belt drive as the torque input mechanism. Also, the outline of engine 20 is shown as being a "V" type engine, however, a four-cylinder inline type engine can also be used.

The overall length of the engine and transmission package is, of course, determined by the amount of real estate available between the vehicle wheels. With the multiple housing package construction utilized for the present invention, the disposition of the differential unit on the engine side of the mounting plane is very flexible and will permit the use of similarly designed power packages in various size vehicles.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transverse drive transmission secured to an engine for transverse installation in a vehicle comprising: a substantially hemispherical torque converter housing portion for housing a torque converter and having a flat mounting surface means for mating with an engine mounting surface, and a torque converter centerline coincident with an engine centerline; a gear housing portion secured to said torque converter housing portion and radially displaced from said engine centerline and having a gear shaft centerline substantially parallel with said engine centerline; and a differential housing portion having an output shaft centerline radially displaced from the gear shaft centerline and including a cylindrical portion housing a differential gear, said cylindrical portion having an end face secured to said gear housing portion and having an outer cylindrical surface extending radially toward said engine centerline with a portion of said cylindrical surface being axially adjacent a portion of said flat mounting surface and being radially closer to the engine centerline than said adjacent portion of said flat mounting surface.

2. An engine mounted transmission comprising: a transmission housing including a torque converter housing having a centerline coincident with an engine centerline, and a flat mounting face securable to an engine mounting face, said torque converter housing having an outer surface defined within a circular cylindrical surface; a gear housing having a centerline parallel to and radially offset from said torque converter housing centerline, said gear housing being secured to said torque converter housing on the torque converter housing side of said flat mounting face and a differential housing having a centerline substantially parallel to and radially offset from both said gear housing centerline and said torque converter housing centerline and being secured to said gear housing on the engine side of said flat mounting face adjacent the engine, the outer surface of said differential housing being defined by a cylinder, a portion of which is disposed within an extension of the cylinder defining the outer surface of the torque converter housing.

3. A transverse engine mounted transmission comprising: a transmission housing including an input housing means for housing a transmission input member and having a substantially circular outer periphery, an input member centerline coincident with an engine centerline, and a flat mounting face securable to an engine mounting face, said input housing means being enclosed in a circular cylindrical envelope defined by an extension of said circular outer periphery along said input centerline, a gear housing having a gear centerline parallel to and radially offset from said input centerline, said gear housing being secured to said input housing means on the input housing means side of said flat mounting face and a differential housing having a differential centerline substantially parallel to and radially offset from both said gear centerline and said input centerline and being secured to said gear housing on the engine side of said flat mounting face adjacent the engine, the outer surface of said differential housing being defined by a substantially circular surface and being enclosed in a cylindrical envelope defined by an extension of said circular surface along said differential centerline, a portion of which is disposed within the circular cylindrical envelope defined by the extension of said circular outer periphery of the input housing means.

* * * * *